US009992357B2

(12) United States Patent
Asthana et al.

(10) Patent No.: US 9,992,357 B2
(45) Date of Patent: Jun. 5, 2018

(54) AUTHENTICATION OF A PRINT REQUEST

(71) Applicant: Hewlett-Packard Development Company, L.P., Houston, TX (US)

(72) Inventors: Prashant Asthana, Bangalore (IN); Somnath Bhattacharya, Bangalore (IN)

(73) Assignee: Hewlett-Packard Development Company L.P., Houston, TX (US)

( * ) Notice: Subject to any disclaimer, the term of this patent is extended or adjusted under 35 U.S.C. 154(b) by 50 days.

(21) Appl. No.: 15/114,924

(22) PCT Filed: Jan. 31, 2014

(86) PCT No.: PCT/US2014/014187
§ 371 (c)(1),
(2) Date: Jul. 28, 2016

(87) PCT Pub. No.: WO2015/116174
PCT Pub. Date: Aug. 6, 2015

(65) Prior Publication Data
US 2016/0344878 A1 Nov. 24, 2016

(51) Int. Cl.
H04N 1/00 (2006.01)
H04L 29/06 (2006.01)
G06F 3/12 (2006.01)

(52) U.S. Cl.
CPC ....... *H04N 1/00212* (2013.01); *G06F 3/1222* (2013.01); *G06F 3/1226* (2013.01);
(Continued)

(58) Field of Classification Search
CPC . H04N 1/00212; G06F 3/1222; G06F 3/1226; G06F 3/1238; G06F 3/1288
(Continued)

(56) References Cited

U.S. PATENT DOCUMENTS 6,337,745 B1   1/2002   Aiello, Jr. et al.
6,552,813 B2   4/2003   Yacoub
(Continued)

FOREIGN PATENT DOCUMENTS

CN   101004668   7/2007
CN   101237424   8/2008
(Continued)

OTHER PUBLICATIONS

Aranda, D.M., "Architectures for Cloud Providers Federation—Authorization of Diffusion," (Research Paper), Sep. 2011, http://eprints.ucm.es/ ~ 51 pages.
(Continued)

*Primary Examiner* — Jamares Q Washington
(74) *Attorney, Agent, or Firm* — HP Inc. Patent Department

(57) ABSTRACT

Examples disclosed herein provide methods and systems for the authentication of a print request. As an example, an email service associated with an enterprise network may receive an electronic message having a destination address indicative of a request to print data included in the message, wherein the destination address may have a domain name associated with the enterprise network. The email service may access an authentication service associated with the enterprise network to determine whether a sender address of the electronic message is a valid address to submit print jobs. Upon determining the sender address is a valid address, the email service may forward the electronic message to a cloud print service to prepare the print job comprising the data included in the message for printing.

16 Claims, 5 Drawing Sheets

Figure 1:
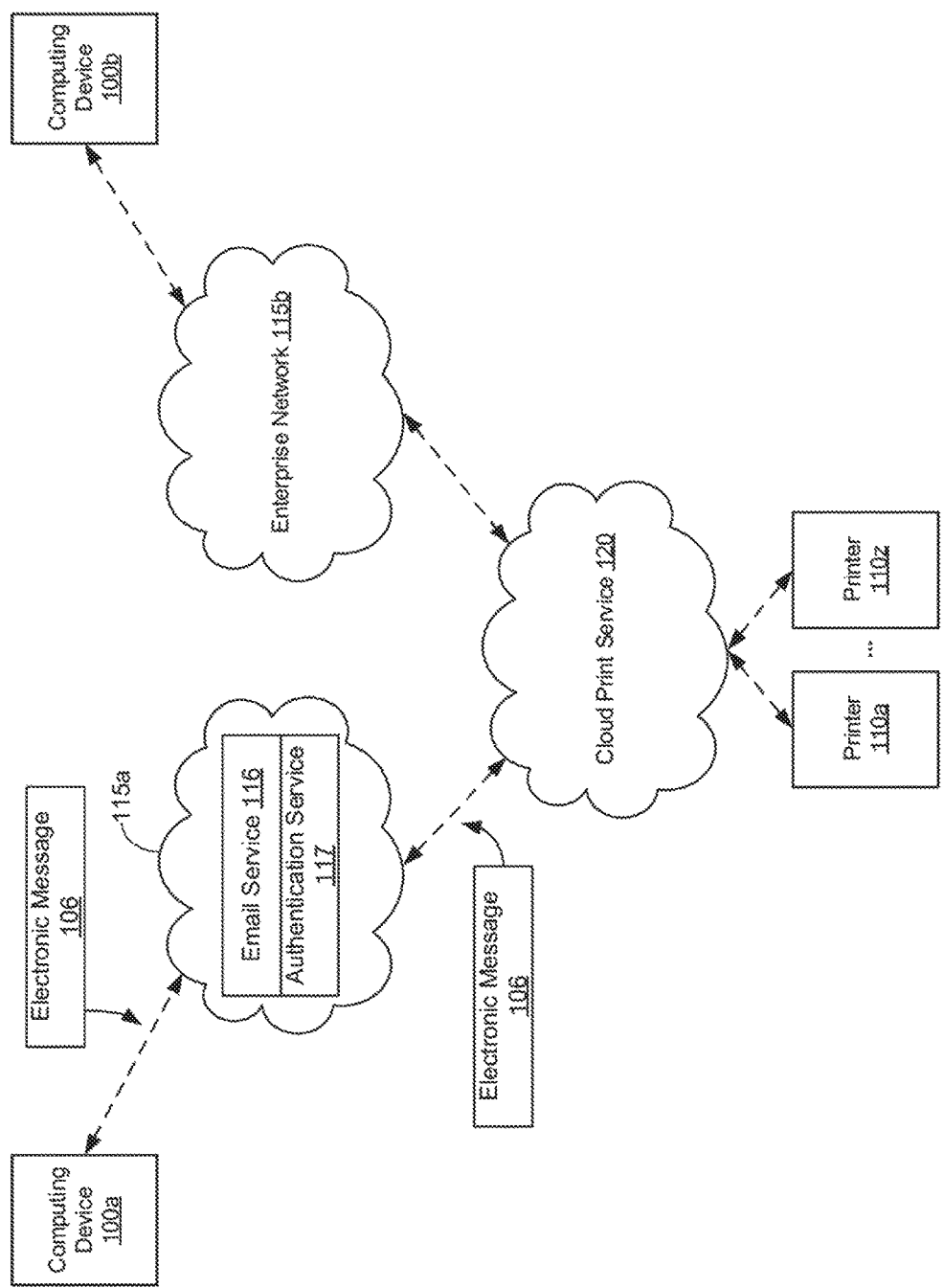

(52) U.S. Cl.
CPC .......... *G06F 3/1238* (2013.01); *G06F 3/1287* (2013.01); *G06F 3/1288* (2013.01); *G06F 3/1292* (2013.01); *H04L 63/08* (2013.01); *G06F 3/1204* (2013.01); *H04N 2201/0094* (2013.01)

(58) Field of Classification Search
USPC .............................................. 358/1.15, 1.14
See application file for complete search history.

(56) References Cited

U.S. PATENT DOCUMENTS

| | | |
|---|---|---|
| 6,909,518 B2 | 6/2005 | Miller et al. |
| 6,975,419 B2 | 12/2005 | Staas et al. |
| 7,019,861 B2 | 3/2006 | Aagesen |
| 7,079,276 B2 | 7/2006 | Kimura |
| 7,084,997 B2 | 8/2006 | Clough |
| 7,088,462 B2 | 8/2006 | Bhogal et al. |
| 7,096,265 B2 | 8/2006 | Simpson et al. |
| 7,167,264 B2 | 1/2007 | Takamiya |
| 7,187,462 B2 | 3/2007 | Oakeson et al. |
| 7,321,437 B2 | 1/2008 | Parry |
| 7,441,003 B1 | 10/2008 | Takeda et al. |
| 7,474,423 B2 | 1/2009 | Garcia et al. |
| 7,503,636 B2 | 3/2009 | Ferguson et al. |
| 7,656,547 B2 | 2/2010 | Kuo et al. |
| 7,760,385 B2 | 7/2010 | Yamaguchi |
| 7,791,747 B2 | 9/2010 | Roksz |
| 8,179,549 B1 | 5/2012 | Evans |
| 2002/0051180 A1 | 5/2002 | Shimbori et al. |
| 2002/0057449 A1 | 5/2002 | Chapman et al. |
| 2003/0011801 A1 | 1/2003 | Simpson et al. |
| 2003/0063309 A1 | 4/2003 | Parry |
| 2003/0107762 A1 | 6/2003 | Kinoshita et al. |
| 2003/0160977 A1 | 8/2003 | Kimura |
| 2004/0073574 A1 | 4/2004 | Bouno et al. |
| 2004/0126165 A1 | 7/2004 | Carroll |
| 2004/0218201 A1 | 11/2004 | Lermant et al. |
| 2004/0218213 A1 | 11/2004 | Shimizu et al. |
| 2005/0270569 A1 | 12/2005 | Hayashi |
| 2005/0275876 A1 | 12/2005 | McLean et al. |
| 2006/0158681 A1 | 7/2006 | Yorimoto et al. |
| 2006/0250631 A1 | 11/2006 | Igarashi |
| 2006/0250638 A1 | 11/2006 | Wang et al. |
| 2006/0265473 A1 | 11/2006 | Muto |
| 2007/0086038 A1 | 4/2007 | Matsuzaki |
| 2007/0146763 A1 | 6/2007 | Yokoyama |
| 2008/0062883 A1 | 3/2008 | Shima |
| 2009/0009802 A1 | 1/2009 | Shaw et al. |
| 2009/0027700 A1 | 1/2009 | Kim et al. |
| 2009/0172143 A1 | 7/2009 | Ishimoto |
| 2009/0219570 A1 | 9/2009 | Fujisawa |
| 2009/0248632 A1 | 10/2009 | Subramanian |
| 2009/0273810 A1 | 11/2009 | Gupta et al. |
| 2010/0020349 A1 | 1/2010 | Carroll |
| 2010/0309510 A1 | 12/2010 | Hansen |
| 2010/0328707 A1 | 12/2010 | Miyake |
| 2011/0007347 A1 | 1/2011 | Kamath et al. |
| 2011/0013219 A1 | 1/2011 | Nuggehalli et al. |
| 2011/0063668 A1 | 3/2011 | Shirai |
| 2011/0096354 A1 | 4/2011 | Liu |
| 2011/0145351 A1 | 6/2011 | Lee et al. |
| 2011/0231473 A1 | 9/2011 | Narayanan et al. |
| 2011/0235085 A1* | 9/2011 | Jazayeri ................ G06F 3/1204 358/1.14 |
| 2012/0026536 A1* | 2/2012 | Shah .................... G06F 3/1206 358/1.15 |
| 2012/0057204 A1 | 3/2012 | Mizoguchi et al. |
| 2012/0102413 A1 | 4/2012 | Gnanamoorthy |
| 2012/0206765 A1 | 8/2012 | Nakajo |
| 2012/0250074 A1 | 10/2012 | Kamppari et al. |
| 2012/0250076 A1 | 10/2012 | Kumar et al. |
| 2012/0272339 A1 | 10/2012 | Kumaravel et al. |
| 2012/0307298 A1 | 12/2012 | Ishige et al. |
| 2013/0107312 A1 | 5/2013 | Venkatesh |
| 2013/0182281 A1 | 7/2013 | Suzuki |
| 2013/0222827 A1 | 8/2013 | Watanabe |
| 2013/0229680 A1 | 9/2013 | Kitada et al. |
| 2013/0308165 A1 | 11/2013 | Venkatesh et al. |
| 2013/0321855 A1* | 12/2013 | Bhatia .................... H04L 63/10 358/1.15 |
| 2014/0240756 A1* | 8/2014 | Ganesan .............. G06K 15/007 358/1.15 |

FOREIGN PATENT DOCUMENTS

| | | |
|---|---|---|
| CN | 101520829 | 9/2009 |
| EP | 2413234 A2 | 2/2012 |
| JP | 2007133817 | 5/2007 |
| KR | 20060109699 | 6/2007 |
| WO | WO-0041064 A1 | 7/2000 |
| WO | WO-2012112159 | 8/2012 |
| WO | WO-2012147089 A1 | 11/2012 |

OTHER PUBLICATIONS

Equitrac, "Rules & Routing," 2010, 2 pages ~ http://www.equitrac.com/.
Experts Exchange, "Setting up multiple printers using same IP address with different ports," Apr. 29, 2010, http://www.experts-exchange.com/ ~ 3 pages.
Google, "Printing Overview," (Web Page), 3 pages, 2012, found at http://support.google.com/.
Hewlett-Packard Company ~ "Cloud printing in the enterprise: Liberating the mobile print experience from cables, operating systems and physical boundaries," Executive Summary ~ Mar. 2010 ~ 8 pages.
Hewlett-Packard Company, "Print where business happens," (Research Paper), Jul. 5, 2012 ~ 2 pages.
Hewlett-Packard Development Company, L.P., "HP Universal Print Driver," Solution and Feature Guide, 2009, 24 pp., http://h20331.www2.hp.com/.
Namtuk, "Automatic Print Email," (Web Page), 2011, found at http://www.automatic-print-email.com/ ~ 3 pages.
Printech, "Intelligent Print Job Routing," (Web Page), 2009 ~ http://www.printech.com/ ~ 1 page.
Ricoh, "doc-Q-manager, The Enterprise-wide Network Solution for Effective Print Job Management," Oct. 3, 2006 ~ http://www.ricoh-photocopiers.co.uk/ ~ 6 pgs.
Schwartz, J. et al., "IBM Launches Enterprise Cloud Services," Jun. 16, 2009, 3 pages.
Silveria, L., "Itinerary not displaying in account," TripIt Help Center, Nov. 9, 2009, 2 pages, ~ https://tripit.zendesk.com/.
Trapani, G., "TripIt Organizes Your Travel Itinerary Automatically via Email," Lifehacker, Sep. 18, 2007, 3 pages ~ https://lifehacker.com/.
Wikipedia, "HP ePrint," Oct. 16, 2011 ~ <https://web.archive.org/ ~ 7 pages.
Wikipedia, "Posterous," Dec. 10, 2010, 3 pages, found at http://en.wikipedia.org/.
Wolber, A., "Print anywhere: Chrome, Google Apps and Cloud Print," (Web Page), Oct. 9, 2012 ~ http://www.techrepublic.com/ ~ 10 pages.
Xerox®, "Xerox® Mobile Print," (Web Page), 2011 ~http://www.office.xerox.com/ ~ 2 pages.

* cited by examiner

AUTHENTICATION OF A PRINT REQUEST

BACKGROUND

Various solutions are available for connecting a printer to a network, such as a local area network (LAN). Examples for connecting a printer to a LAN include using a printer with networking capabilities built in (e.g., network-enabled printer), or attaching a printer to a separate network endpoint, such as a print server connected to the LAN. As an example, a network-enabled printer may connect to a LAN over either WI-FI or Ethernet. Upon connecting the printer to the LAN, users of client devices connected to the LAN may be able to connect with the network-connected printer, and utilize features of the printer, such as submit a print job.

Portable client devices have substantially gained in popularity, particularly with the ability to communicate with other portable devices via a network, such as the Internet. Portable or mobile client devices include, for example, notebook computers, smartphones, and tablets. Such portable or mobile devices may be wirelessly coupled to a LAN. As a result, users of such devices, while coupled to the LAN, may wirelessly submit a print job to a printer that is also coupled to the LAN.

DRAWINGS

Figure 2:
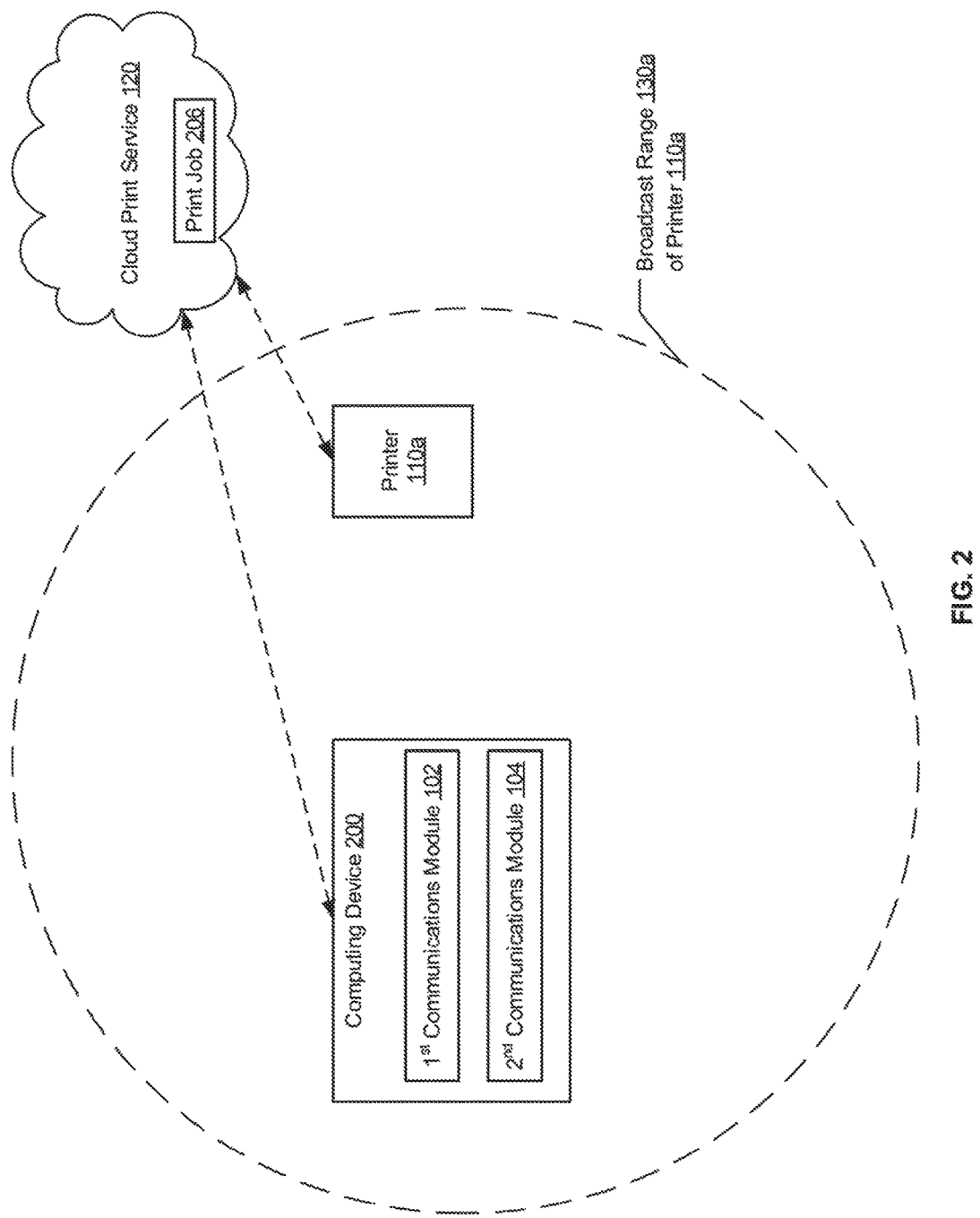
Figure 3:
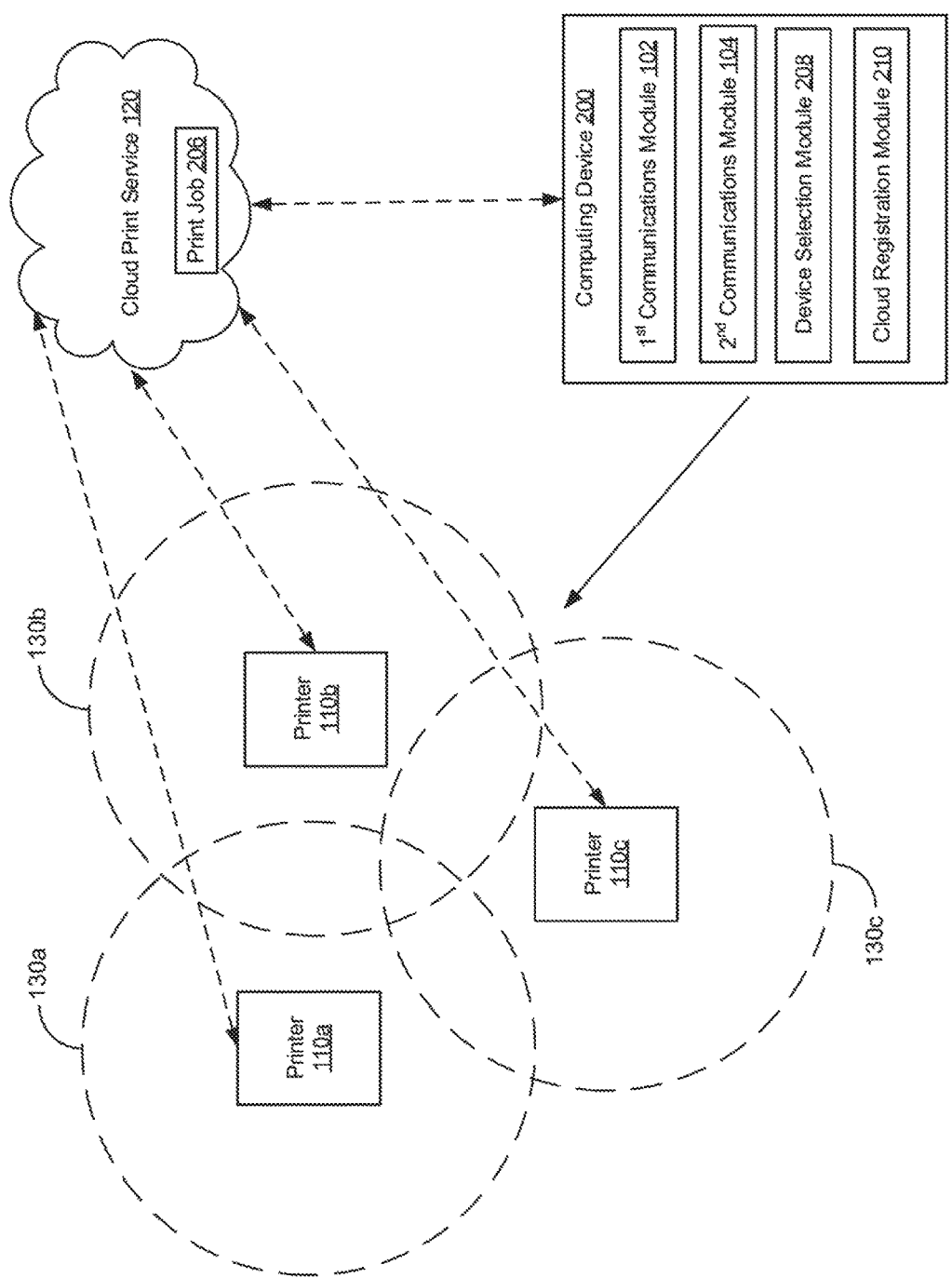
Figure 4:
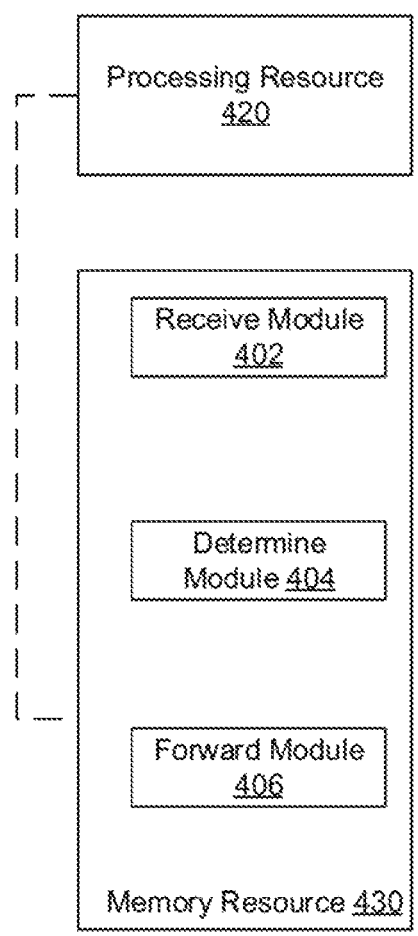
Figure 5:
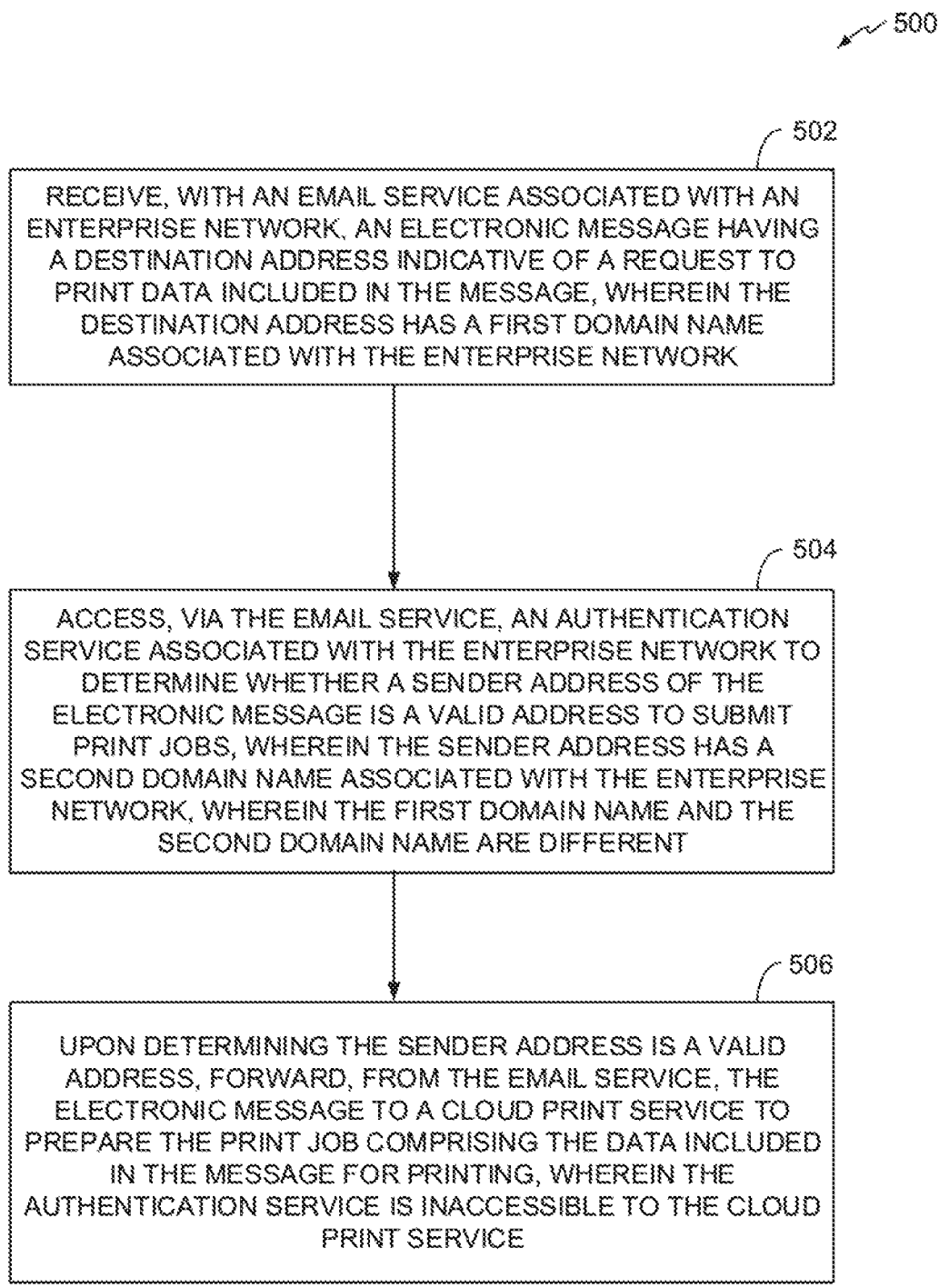

FIG. 1 illustrates a sample environment for enterprise printing via a cloud service provider, such as a cloud-based printing service, according to an example;

FIGS. 2-3 provide an illustration of a computing device 200 of an enterprise user initiating the printing of a print job 206, according to an example;

FIG. 4 is a block diagram depicting a memory resource and a processing resource, according to one example; and FIG. 5 is a flow diagram depicting steps to implement an example.

DETAILED DESCRIPTION

Web-connected printers are network-connected printers that are capable of receiving communications and printable content via a computer network, such as the Internet, without receiving the printable content directly from a client device, such as a desktop computer, notebook computer, and/or smartphone. As an example, a cloud-based print service may send a print job over the Internet to the web-connected printer. As a result, the print job may be transmitted to the web-connected printer and printed by the web-connected printer, all without any user intervention. For example, the user may not have to determine the IP address of the web-connected printer and install drivers for the printer on a device before submitting the print job.

Examples of print jobs that may be sent over the Internet include, but are not limited to, scheduled content delivery and print jobs sent to an email address registered to the web-connected printer. With regards to scheduled content delivery, a user may have the ability to subscribe for content to be delivered at a scheduled time (e.g., every morning at 7 a.m.), and the content may be automatically delivered to a web-connected printer at the scheduled time over the Internet via the cloud print service. With an email address registered to a web-connected printer, a print job may be submitted by emailing a document to the email address having a domain name associated with the cloud print service, and the cloud print service may deliver the document to the web-connected printer over the Internet. As a result, a user may be able to deliver a print job to a printer located in a different geographical location.

Although using web-connected printers in a consumer setting may be relatively simple, where a limited number of web-connected printers may be present, the level of complexity may increase in an enterprise setting, where numerous web-connected printers may be present in various geographical locations. For example, if a user desires to submit a print job to a nearby web-connected printer in an enterprise setting, the user may have to determine the email address registered to the nearby printer in order to submit the print job to the cloud print service. In addition, if the user needs to submit a print job to a web-connected printer that meets certain requirements (e.g., supports color printing), the user may have to determine the specification for nearby printers before determining the email address for the appropriate printer. Additionally, users in an enterprise setting desiring to submit print jobs to web-connected printers belonging to the enterprise may have to deal with certain security measures that are in place to ensure that non-enterprise users are not given access to print to the printers. As an example, the cloud print service may be given access to secure information concerning users within the enterprise in order to determine whether a print job sent to an email address registered to a web-connected printer originated from a user within the enterprise.

Examples disclosed herein provide for the ability for users of an enterprise network to submit print jobs to web-connected printers. Rather than a user taking the time to find a web-connected printer and determine the email address registered to the printer for handling a print job, examples disclosed herein allow for the user to submit the print job to an email address assigned to the user (or another user) for handling print requests within the enterprise network. Determination of whether the print job originated from a user of the enterprise may take place within the enterprise network prior to sending the print job to a cloud print service for rendering the print job and making the print job available for printing to a web-connected printer proximate to a computing device of the user (or other user).

As used herein, the term "cloud" is defined as including, but not limited to, computing resources (hardware, software, and firmware) that are delivered as a service over a network (such as the Internet). As used herein, the term "network" is defined as including, but not limited to, one or more connections between devices systems, servers, applications and/or users that allow transfer and exchange of data and information. Networks may be wired and/or wireless, and utilize a variety of different topologies, transmission media, and protocols. Examples of a network include, but are not limited to, a LAN, a wireless LAN (WLAN), and the Internet.

As used herein, a "server" is a system including software and hardware that responds to requests across a computer network to provide, or help to provide, a network service. As used herein, a "cloud server" is a server that is delivered through a cloud computing platform over the Internet. Cloud servers possess and exhibit similar capabilities and functionality to a typical server but are accessed remotely from a cloud service provider or a cloud computing environment (e.g., cloud-based printing service).

As used herein, a "printer" or "printing device" refers to any liquid inkjet printer, solid toner-based printer, liquid toner-based printer, or any other electronic device that prints. In examples described herein, a printer or printing device may include any multifunctional electronic device that performs a function such as scanning and/or copying in addition to printing (e.g., a multifunction printer (MFP), etc.).

As used herein, a "print job" or "job" refers at least one of content and instructions as to formatting and presentation of the content sent to a computer system for printing. A print job may be stored in any suitable format, such as a computer-readable format or numerical form, so that it can be stored and used in computing devices, servers, printers and other machines capable of performing calculations and manipulating data.

As used herein a "low-power" protocol is a protocol that provides considerably reduced power consumption and lower cost than a high speed protocol. As used herein a "high speed" protocol is a protocol that can deliver high data speed/rate at the cost of more power consumption (e.g., compared to a low-power protocol). As used herein, a "communications protocol" is defined as including, but is not necessarily limited to, a format, syntax, rules, and signaling arrangement utilized to transmit/receive data to and from other devices, using one or more "wireless radios."

Referring now to the figures, FIG. 1 illustrates a sample environment for enterprise printing via a cloud service provider, such as a cloud-based print service 120, according to an example. The cloud print service 120 may render a print job delivered to the service 120 via a network associated with an enterprise (e.g., network 115a, network 115b, etc.), and the service 120 may make the rendered job available to a printer for printing (e.g., printer 110a, printer 110z, etc.).

Networks associated with different enterprises (e.g., network 115a and network 115b) may deliver print jobs to the cloud print service 120. For example, a user belonging to a first enterprise may send a print job via a computing device 100a, and a user belonging to a second enterprise may send a print job via a computing device 100b. In examples described herein, a computing device may be a desktop computer, laptop (or notebook) computer, workstation, tablet computer, mobile phone, smart device, server, blade enclosure, or any other processing device or equipment. In some examples, a computing device may further be a device able to send and receive network requests, send and receive data, and/or otherwise communicate with the enterprise network, for example, via the Internet. Such a computing device may communicate with an enterprise network using a wireless or mobile communications technology, such as WI-FI, 3G, or 4G, and/or via any computer network(s) (e.g., the Internet).

Prior to delivering a print job to the cloud print service 120, an enterprise network for a particular enterprise (e.g., network 115a, network 115b, etc.) may perform an authentication process by verifying whether the user submitting the print job via a computing device is an authorized user of the enterprise and has permission to submit print jobs. For example, an authorized user that has exceeded a print quota may be denied permission to submit the print job. By performing this authentication process within the enterprise network, rather than a network outside the enterprise network (e.g., the cloud print service 120), sensitive information for the enterprise (e.g., information regarding users of the enterprise) may be kept within the enterprise, and inaccessible to the cloud print service 120. This may allow an enterprise to enforce certain security measures that an outside network, such as the cloud print service 120, may not follow.

Referring to FIG. 1, an enterprise user of the computing device 100a may send an electronic message 106 to a destination address associated with enterprise network 115a. As an example, the enterprise network 115a may be supported by one or more services that respond to requests made across the enterprise network 115a (e.g., email service 116 and authentication service 117). In examples described herein, each of the services 116 and 117 may be implemented by one or more computing resources (e.g., computing device(s), such as server(s)), such as one or more servers. Although it is not illustrated, enterprise network 115b may operate and be implemented as described in relation to enterprise network 115a.

For example, service 116 may comprise any combination of hardware and programming to implement the functionalities of service 116. In examples described herein, such combinations of hardware and programming may be implemented in a number of different ways. For example, the programming may be processor executable instructions stored on at least one non-transitory machine-readable storage medium and the hardware may include at least one processing resource to execute those instructions. In such examples, the machine-readable storage medium may store instructions that, when executed by processing resource(s), implement service 116. In such examples, service 116 may include the machine-readable storage medium storing the instructions and the processing resource(s) to execute the instructions, or the machine-readable storage medium may be separate from but accessible to computing device(s) comprising the processing resource(s) and implementing service 116.

In some examples, the instructions can be part of an installation package that, when installed, can be executed by the processing resource(s) to implement service 116. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a server including the processing resource. In such examples, the machine-readable storage medium may include memory such as a hard drive, solid state drive, or the like. In other examples, some or all of the functionalities of service 116 may be implemented in the form of electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, service 117 may comprise any combination of hardware and programming to implement the functionalities of service 117, as described above in relation to service 116. In other examples, some or all of the functionalities of service 117 may be implemented in the form of electronic circuitry.

The electronic message 106 may be an email message or other user-generated electronic message. The destination address can be an email address or other suitable destination address. An email address, as used herein, is a string of characters separated into two parts by an "@" symbol, having a "local part" preceding the "@" symbol and a domain name following the "@" symbol. For example, for an email address "john@mail.com", "john" is the local part of the email address, and "mail.com" is the domain name of the email address. As an example, if the electronic message 106 is an email message, the domain name part of the destination email address may be associated with the enterprise network 115a that the user belongs to. For example, the enterprise may own or manage the domain name. As a result, an email service 116 associated with the enterprise network 115a may receive the electronic message 106 addressed to the destination address. The email service 116 may use various protocols for sending and receiving email messages, such as, but not limited to, Simple Mail Transfer Protocol (SMTP), Post Office Protocol (POP), or Internet Message Access Protocol (IMAP).

The destination email address of the email message 106 may be indicative of a request to print data included in the electronic message 106. As an example, the domain name part of the destination email address may be indicative of the print request. For example, a domain may be created within the enterprise network 115a for handling enterprise print requests (e.g., enterprise1print.com), such that all users within the network 115a may have an email address associated with the created domain. As an example, in addition to having an email address assigned to a user for sending and receiving standard email messages (e.g., user1@enterprise1.com), the user may also be assigned an email address to use for submitting a print job within the enterprise (e.g., user1@enterprise1print.com). In such examples, to submit the print job, the user may send the email message to "user1@enterprise1print.com". As a result, when the email service 116 receives email messages addressed to the domain "@enterprise1print.com", the email service 116 may determine that the email message includes data to be printed. As an example, the data might be included in the body of the email (e.g., as text, images, etc.) or the data might be included as an attachment to the email.

The local part of the destination address may be indicative of the user the print job is intended for. As an example, if the user (e.g., user1) desires to submit a print job to be assigned to himself, the user may send the email message to a destination email address associated with himself (e.g., user1@enterprise1print.com). As another example, if the user (e.g., user1) desires to submit a print job to be assigned to another user within the enterprise (e.g., user2), the user may send the email message to a destination email address associated with the other user and indicative of the print request (e.g., user2@enterprise1print.com).

Upon receiving the electronic message 106, the email service 116 may access authentication service 117 associated with the enterprise network 115a to determine whether the sender of the message 106 is authorized to submit the print job. For example, the enterprise network 115a may only allow print requests from users belonging to the enterprise. As an example, the authentication service 117 may determine whether the sender address of the electronic message 106 (e.g., user1@enterprise1.com) is a valid address for submitting print jobs by determining whether the sender address belongs to a user of the enterprise. For example, the authentication service 117 may match the sender address to a user of the enterprise by accessing and searching directory information of users belonging to the enterprise. The authentication service 117 may use various protocols for accessing the directory information, such as, but not limited to, Lightweight Directory Access Protocol (LDAP). If the sender address is matched to a user of the enterprise, the authentication service 117 may indicate to the email service 116 that the sender address belongs to a user of the enterprise network 115a. In response to the indication from the authentication service 117 that the sender address belongs to a user of the enterprise network 115a, the email service 116 may determine that the sender address (e.g., user1@enterprise1.com) is a valid address for submitting print jobs.

In addition to matching the sender address to a user of the enterprise, the authentication service 117 may consider other factors while determining whether the user has the authorization or permission to submit print jobs (e.g., determining whether the user has exceeded a print quota). As an example, the authentication service 117 may access a database stored on the service 117, and search the database for user information indicating whether the user has permission to submit print jobs. For example, if the user has exceed a print quota, the user may be flagged in the database to prevent further print requests. As a result, although the sender address belongs to a user of the enterprise network 115a, the authentication service 117 may indicate to the email service 116 that the user is not authorized to submit the print job.

Referring to FIG. 1, upon determining that the sender address is a valid address, the email 116 may forward the electronic message 106 to the cloud print service 120 for preparing the print job. As an example, the cloud-based printing service may prepare the print job by rendering and/or formatting the data included in the message 106 for printing. Forwarding the electronic message 106 to the cloud print service 120 may include forwarding the message 106 to a destination address that corresponds to the service 120, which may be an email address or other suitable destination address. As an example, if the destination address is an email address, the domain name part of the address may be associated with the service 120 (e.g., "@cloudserver.com"). For example, the service 120 may own or manage the domain name "cloudserver.com". As an example, the electronic message 106 may be received by an email server associated with the service 120 (e.g., SMTP server). In some examples, service 120 may be implemented by one or more computing resources (e.g., computing device(s), such as server(s)). Service 120 may comprise any combination of hardware and programming to implement the functionalities of service 112, as described above in relation to service 116. In other examples, some or all of the functionalities of service 120 may be implemented in the form of electronic circuitry.

In order for the cloud-based printing service to determine which enterprise network the print job has originated from (e.g., from enterprise network 115a and not from enterprise network 115b), the sender address of the electronic message 106 sent from an enterprise network to the cloud print service 120 may be associated with the enterprise network. For example, if the print job has originated from enterprise network 115a associated with domain "enterprise1print.com", for example, then the sender address of the electronic message 106 sent to the cloud print service 120 may be "user1@enterprise1print.com". In some examples, the local part of the sender address may be associated with an enterprise user. For example, in the example above, since the electronic message 106 is addressed from "user1", the service 120 may determine that the print job is to be assigned to user1. In such examples, when a device associated with user1 comes within proximity of a web-connected printer 110 that is a part of enterprise network 115a, printing may be initiated, as will be further described.

Wireless personal area network (WPAN) is a network for interconnecting devices centered on an individual person's workspace or home, for example. Ad-hoc networking is one of the key concepts of WPANs, whereby devices can be a part of the network temporarily (i.e., join and leave at will). The ease of joining and leaving a network may be desirable to users of mobile devices such as personal digital assistants (PDAs), laptops, tablets, and smartphones.

Wireless technologies for exchanging data, for example, between a mobile device and a printer, can be categorized into two broad segments namely: a) high speed protocols such as WI-FI, BLUETOOTH, cellular network protocols, and any broadband communications protocol; and b) low power protocols such as ANT®, BLUETOOTH low energy (BLE), ZIGBEE, and infrared data association (IRDA). Thus, either a protocol can deliver high data speed at the cost of increased power consumption, or the protocol can operate on low power but with low data transmission speed. Hence, to provide an effective WPAN for energy conscious devices, it would be beneficial to provide a solution with the following attributes: low manufacturing cost and low power consumption, ad-hoc with little or no setup overhead, secure, and high bandwidth to support high speed data transfer. Examples described herein provide a solution wherein the ultra low power radios work in collaboration with high speed networks like 3G, 4G, long term evolution (LTE), and WI-FI to create a high speed ad-hoc WPAN that can support printing operations.

FIG. 2 provides an illustration of a computing device 200 of an enterprise user initiating the printing of a print job 206 by coming within proximity of a web-connected printer 110a, according to an example. Cloud print service 120, as also illustrated in FIG. 1, can be a cloud infrastructure for providing cloud services to web-connected client devices such as computing device 200 and web-connected printer 110a. For example, cloud print service 120 may provide various printing services such as email printing and scheduled content delivery.

Computing device 200 includes a first communications module 102 and a second communications module 104. First communications module 102 includes a combination of software and hardware for wirelessly transmitting and receiving data. First communications module 102 may include a wireless radio for communicating wirelessly. First communications module 102 is configured to implement a low-power communications protocol such as a BLE protocol, an ANT protocol, a ZIGBEE protocol, an IRDA protocol, or a UWB protocol. Accordingly, first communications module 102 may include a low-power radio that corresponds to the low-power protocol implemented. Second communications module 104 includes a combination of software and hardware for wirelessly transmitting and receiving data. Second communications module 104 may include a wireless radio for communicating wirelessly. Second communications module 104 is configured to implement a high-speed communications protocol such as an Internet protocol, a broadband communications protocol, or a cellular network protocol (e.g., 3G, 4G, LTE, etc.).

Web-connected printer 110a may have corresponding first and second communications modules, similar to the computing device 200, to exchange communications with the device 200. For example, when the printer 110a broadcasts a signal via one or more of the communications modules, the computing device 200 may detect the broadcasted signal by listening for such signals via or more of the communications modules.

As an example, when the web-connected printer 110a is available for printing, the printer 110a may broadcast a signal by the first communications module, using the low-power communications protocol. For example, using a low power radio like ANT or BLE, printer 110a may broadcast its device ID and availability for printing. As an example, the broadcast may be detected by the first communications module 102 of the computing device 200 that is within a broadcast range 130a of printer 110a. For example, computing device 200 may be in close proximity to printer 110a. In some examples, the first communications module of the printer 110a may adjust (i.e., increase or decrease) a signal strength of the broadcast to control the broadcast range 130.

Computing device 200, in the range 130 of the broadcast, may connect to the cloud print service 120 in response to the broadcast using, for example, the high-speed communications protocol 104. Printer 110a may also connect to the cloud print service 120 using the high-speed communications protocol. For example, using a high-speed radio like WI-FI, 3G, 4G, LTE, broadband, or Internet, computing device 200 and printer 110a may connect to cloud print service 120.

When both the computing device 200 and the web-connected printer 110a are connected to the cloud print service 120, the printer 110a may be able to retrieve and print any print jobs that are currently stored on cloud print service 120 that belong to the user owning the computing device 200. For example, referring back to FIG. 1, the electronic message 106 submitted by a user of computing device 100a may include print data assigned to another user within the enterprise network 115a. As an example, the user of computing device 100a may send the electronic message 106 to a destination email address associated with the user of computing device 200 (e.g., user2@enterprise1print.com). As mentioned above, the local part of the destination address may be indicative of the user the print job is to be assigned to. Upon the cloud print service 120 receiving the electronic message 106, the service 120 may render and format the data included in the message 100 to generate the print job 206. Referring back to FIG. 2, when the computing device 200 owned by user2 comes within proximity of the web-connected printer 110a, printing of the print job 206 may be initiated.

As an example, when both the computing device 200 and the web-connected printer 110a are connected to the cloud print service 120, the computing device 200 may identify itself to the cloud print service 120 (e.g., via a device ID associated with the device 200) and send the broadcasted device ID of the web-connected printer 110a to the cloud print service 120. The cloud print service 120 may search for pending print jobs that belong to the user of the computing device 200 and send a list of the pending jobs to the user via the computing device 200. Upon receipt of the pending print jobs, the user may select one or more of the print jobs, and the cloud print service 120 may forward the selected print jobs to the web-connected printer 110a for printing (e.g., by using the device ID of the web-connected printer 110a).

Accordingly, the described example allows the creation of a virtual short-lived (e.g., ad-hoc) solution to initiate printing of print jobs belonging to a user of a computing device that may be co-located with a web-connected printer, using a hybrid of low-power radios and high speed wireless communications. Thus, the described solution can create a high-speed ad-hoc WPAN using low power radios in collaborations with high speed networks (e.g., 3G, 4G, WI-FI).

FIG. 3 is another example of a computing device 200 of an enterprise user initiating the printing of a print job 206 by selecting a printer from a group of web-connected printers 110 that are within proximity of the device 200. In the example of FIG. 3, computing device 200 includes first communications module 102 second communications module 104, device selection module 208, and cloud registration module 210. As an example, the web-connected printers 110 may have corresponding first and second communications modules, and a cloud registration module.

The cloud registration module 210 may register computing device 200 tip the cloud print service 120. For example, computing device 200 may connect to the cloud print service 120 using the second communication module 104 (i.e., high-speed communication), or via hypertext transfer protocol (HTTP) for cloud registration. During cloud registration, cloud print service 120 may assign the computing device 200 a unique identification (e.g., device ID) and/or a secure code for authentication. Accordingly, computing device 200 may present the unique identification and/or secure code when subsequently connecting to the cloud print service 120. Similarly, the web-connected printers 110 may be assigned unique identification.

As mentioned above, an organization may gave numerous web-connected printers spread out across a place of business. Referring to FIG. 3, as the user of the computing device 200 comes within proximity of web-connected printers 110a-110c, the computing device 200 may include a device selection module 208, allowing the user to select a printer from the group of web-connected printers 110a-110c. In addition, rather than selecting a printer from the group of web-connected printers 110a-110c, the computing device 200 may send broadcasted information (e.g., device ID of a printer) to the cloud print service 120 each time the device 200 comes within proximity of a web-connected printer 110. Referring to FIG. 3, it is possible for the computing device 200 to be within broadcast range 130a-130c of all three web-connected printers 110a-110c.

FIG. 4 depicts an example of logical components for implementing various embodiments. In the foregoing discussion, various components are identified and refer to a combination of hardware and programming configured to perform a designated function. Looking at FIG. 4, the programming may be processor executable instructions stored on tangible memory resource 450 and the hardware may include processing resource 420 for executing those instructions. Thus, memory resource 430 may store program instructions that, when executed by processing resource 420, implement the various components in the foregoing discussion.

Memory resource 430 may be any of a number of memory components capable of storing instructions that can be executed by processing resource 420. Memory resource 430 may be non-transitory in the sense that it does not encompass a transitory signal but instead is made up of one or more memory components configured to store the relevant instructions. Memory resource 430 may be implemented in a single device or distributed across devices. Likewise, processing resource 420 represents any number of processors capable of executing instructions stored by memory resource 430. Processing resource 420 may be integrated in a single device or distributed across devices. Further, memory resource 430 may be fully or partially integrated in the same device as processing resource 420, or it may be separate but accessible to that device and processing resource 420. In some examples, memory resource 430 may be a machine-readable storage medium.

In one example, the program instructions can be part of an installation package that when installed can be executed by processing resource 420 to implement the various components of the foregoing discussion. In this case, memory resource 430 may be a portable medium such as a CD, DVD, or flash drive or a memory maintained by a server from which the installation package can be downloaded and installed. In another example, the program instructions may be part of an application or applications already installed. Here, memory resource 430 can include integrated memory such as a hard drive, solid state drive, or the like.

In FIG. 4, the executable program instructions stored in memory resource 430 are depicted as receive module 402, determine module 404, and forward module 406. Receive module 402 represents program instructions that when executed cause processing resource 420 to receive an electronic message having a destination address indicative of a request to print data included in the message. Determine module 404 represents program instructions that when executed cause processing resource 420 to determine whether a sender address of the electronic message is a valid address for submitting print jobs. As an example, the determination may be made by determining whether the sender address belongs to a user of an enterprise network. Forward module 406 represents program instructions that when executed cause processing resource 420 to forward the electronic message to a cloud print service, if the sender address is a valid address.

FIG. 5 is a flow diagram 600 of steps taken to implement a method for authenticating a print request. In discussing FIG. 5, reference may be made to the example scenarios illustrated in FIGS. 1-3 and the components depicted in FIG. 4. Such reference is made to provide contextual examples and not to limit the manner in which the method depicted by FIG. 5 may be implemented.

At 502, an email service associated with an enterprise network may receive an message having a destination address indicative of a request to print data included in the message. As an example, the destination address may have a first domain name associated with the enterprise network. The electronic message may be an email message and the destination address may be an email address. Referring to FIG. 1, the user of computing device 100a may have an email address having a first domain name associated with enterprise network 115a for handling standard email messages (e.g., user1@enterprise1.com). In addition, a second domain name that is different from the first domain name may be created within the enterprise network 115a for handling enterprise print requests (e.g., enterprise1print.com), such that all users within the network 115a may also have an email address associated with the newly created domain. Therefore, in order to submit the print job, the user of computing device 100a may send the email message to a destination email address indicative of the print request and associated with the enterprise network 115a (e.g., user1@enterprise1print.com). As a result, when the email service 116 receives email messages addressed to the domain "@enterprise1print.com", the email service 116 may determine that the email message includes data to be printed.

At 504, the email service may access an authentication service associated with the enterprise network to determine whether a sender address of the electronic message is a valid address for submitting print jobs. Referring to FIG. 1, the authentication service 117 may provide an indication of whether the sender address of the electronic message 106 (e.g., user1@enterprise1.com) is a valid address for submitting print jobs by determining whether the sender address belongs to a user of the enterprise.

At 506, upon determining the sender address is a valid address, the email service may forward the electronic message (e.g., addressed from the destination address) to a cloud print service to prepare the print job comprising the data included in the message for printing. The authentication service may be inaccessible to the cloud print service. By performing the authentication process within the enterprise network 115a, rather than a network outside the enterprise (e.g., the cloud print service 120), sensitive information for the enterprise may be kept within the enterprise.

Embodiments can be realized in any memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" may be at least one machine-readable storage medium. The term "non-transitory" is used only to clarify that the term media, as used herein, does not encompass a signal. Thus, the memory resource can comprise any one of many physical such as, for example, electronic, magnetic, optical, electromagnetic, or semiconductor media. More specific examples of suitable computer-readable media include, but are not limited to hard drives, solid state drives, random access memory (RAM), read-only memory (ROM), erasable programmable read-only memory, flash drives and portable compact discs.

Although the flow diagram of FIG. 5 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method to handle a print job, the method comprising:
   receiving, by a processor associated with an email service of an enterprise, an electronic message having a sender email address and a destination email address;
   determining, by the processor, whether the electronic message is a print request to print data in the electronic message, by determining whether a domain name of the destination email address of the electronic message matches a first domain name of the enterprise, wherein the first domain name of the enterprise is created only to receive print requests for the enterprise;
   in response to a determination that the electronic message is a print request when the domain name of the destination email address matches the first domain name of the enterprise, accessing, by the processor associated with the email service of the enterprise, an authentication service associated with the enterprise to determine whether the sender email address of the electronic message is a valid address to submit print jobs, wherein the sender email address has a second domain name of the enterprise different from the first domain name of the enterprise; and
   upon determining that the sender email address is a valid address, forwarding, by the processor, the electronic message to a cloud print service that provides a print service including to prepare a print job based on the data included in the electronic message and send the print job to a printer for printing.

2. The method of claim 1, wherein determining whether the sender email address is a valid address to submit print jobs includes determining whether the sender email address is an email address of a user of the enterprise.

3. The method of claim 1, wherein forwarding the electronic message to the cloud print service comprises forwarding the electronic message from the destination email address to an address of the cloud print service having a third domain name, wherein the third domain name of the cloud print service is different than the first domain name and the second domain name of the enterprise.

4. The method of claim 3, wherein the destination email address of the electronic message includes a user name of a user in the enterprise, and the print job prepared by the cloud print service is assigned to the user in the enterprise based on the user name in the destination email address.

5. The method of claim 1, wherein a user name of the sender email address is different from a user name of the destination email address such that the sender email address is associated with a first user and the destination address is associated with a second user, and wherein the print job prepared by the cloud print service is assigned to the second user.

6. The method of claim 5, further comprising:
   in response to a determination that a computing device of the second user is within a predetermined proximity of a web-connected printer, delivering the print job, via the cloud print service to the web-connected printer after the computing device accesses the cloud print service and the web-connected printer is selected for printing the print job.

7. A system to handle a print job, the system comprising:
   a processor associated with an email service of an enterprise; and
   a memory storing instructions that when executed cause the processor to:
      receive an electronic message having a sender email address and a destination email address;
      determine whether the electronic message is a print request to print data in the electronic message, including determining whether a domain name of the destination email address matches a first domain name of the enterprise, wherein the first domain name of the enterprise is created only to receive print requests for the enterprise;
      upon determining that the electronic message is a print request, access an authentication service associated with the enterprise to determine whether the sender email address of the electronic message is a valid address to submit print jobs, wherein the sender email address has a second domain name of the enterprise network different from the first domain name of the enterprise; and
      upon determining that the sender email address is a valid address, forward the electronic message to a cloud print service that provides a print service including to prepare a print job based on the data included in the electronic message and send the print job to a printer for printing.

8. The system of claim 7, wherein to determine whether the sender email address is a valid address, the instructions are to cause the processor to determine whether the sender email address is an email address of a user of the enterprise.

9. The system of claim 7, wherein the destination email address of the electronic message includes a user name of a user in the enterprise, and the print job prepared by the cloud print service is assigned to the user in the enterprise based on the user name in the destination email address.

10. The system of claim 7, wherein a user name of the sender email address is different from a user name of the destination email address such that the sender email address is associated with a first user and the destination address is associated with a second user, and wherein the print job prepared by the cloud print service is assigned to the second user.

11. The system of claim 10, wherein in response to a determination that a computing device of the second user is within a predetermined proximity of a web-connected printer, the print job is delivered via the cloud print service to the web-connected printer after the computing device accesses the cloud print service and the web-connected printer is selected for printing the print job.

12. A non-transitory memory resource comprising instructions that when executed cause a processing resource associated with an email service of an enterprise to:
  receive an electronic message having a sender email address and a destination email address;
  determine whether the electronic message is a print request to print data in the electronic message, including determining whether a domain name of the destination email address of the electronic message matches a first domain name of the enterprise, wherein the first domain name of the enterprise is created only to receive print requests for the enterprise;
  upon determining that the electronic message is a print request, determine whether the sender email address of the electronic message is a valid address to submit print jobs by determining whether the sender email address is an email address of a user in the enterprise, wherein the sender email address has a second domain name associated with the enterprise different from the first domain name; and
  upon determining the sender email address is a valid address, forward the electronic message to a cloud print service that provides a print service including to prepare a print job based on the data included in the electronic message and send the print job to a printer for printing.

13. The non-transitory memory resource of claim 12, wherein the instructions to forward comprise instructions to forward the electronic message from the destination email address to an address of the cloud print service having a third domain name, wherein the third domain name of the cloud print service is different than the first domain name and the second domain name of the enterprise.

14. The non-transitory memory resource of claim 12, wherein a user name of the sender email address is different from a user name of the destination email address such that the sender email address is associated with a first user and the destination email address is associated with a second user, and wherein the print job prepared by the cloud print service is assigned to the second user.

15. The non-transitory memory resource of claim 14, wherein in response to a determination that a computing device of the second user is within a predetermined proximity of a web-connected printer, the print job is delivered via the cloud print service to the web-connected printer after the computing device accesses the cloud print service and the web-connected printer is selected for printing the print job.

16. The system of claim 7, wherein to forward the electronic message to the cloud print service, the instructions are to cause the processor to forward the electronic message from the destination email address to an address of the cloud print service having a third domain name, wherein the third domain name of the cloud print service is different than the first domain name and the second domain name of the enterprise.

* * * * *